June 8, 1965  C. H. WILLIAMSON ETAL  3,187,375
FISH-DRESSING MACHINES
Filed Jan. 15, 1963  6 Sheets-Sheet 1

Inventors
CHARLES HENRY WILLIAMSON
LORENTZ SAVILLE

By
Bailey, Stephens & Huettig
Attorneys

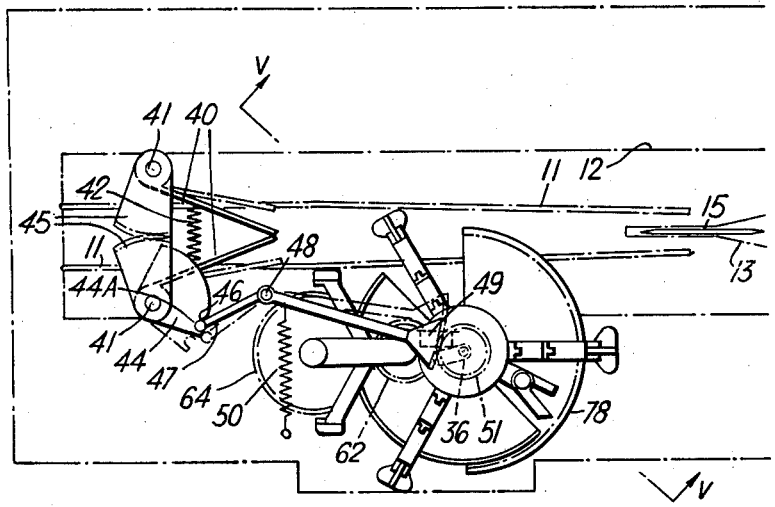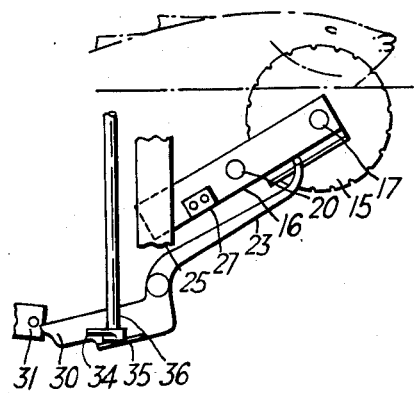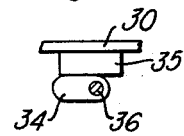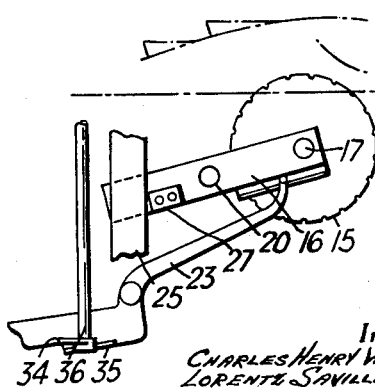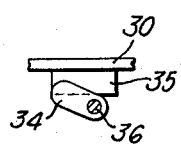

June 8, 1965  C. H. WILLIAMSON ETAL  3,187,375
FISH-DRESSING MACHINES

Filed Jan. 15, 1963  6 Sheets-Sheet 3

Inventors
CHARLES HENRY WILLIAMSON
LORENTZ SAVILLE

By Bailey, Stephens & Huettig
Attorneys

June 8, 1965 C. H. WILLIAMSON ETAL 3,187,375
FISH-DRESSING MACHINES
Filed Jan. 15, 1963 6 Sheets-Sheet 4

Inventor
CHARLES HENRY WILLIAMSON
LORENTZ SAVILLE
By
Bailey, Stephens & Huettig
Attorneys June 8, 1965     C. H. WILLIAMSON ETAL     3,187,375
FISH-DRESSING MACHINES
Filed Jan. 15, 1963     6 Sheets-Sheet 5
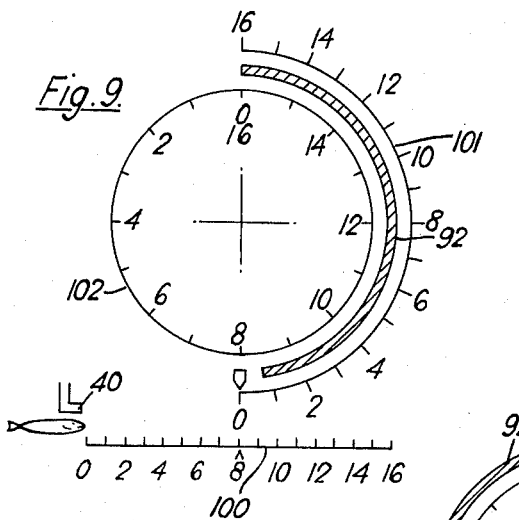
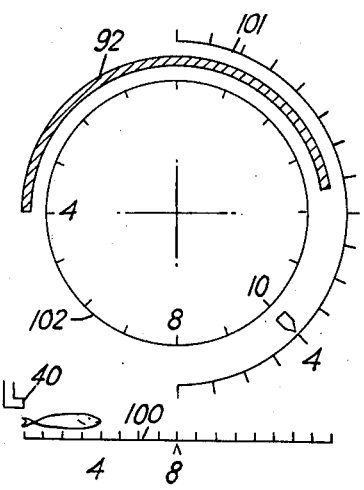
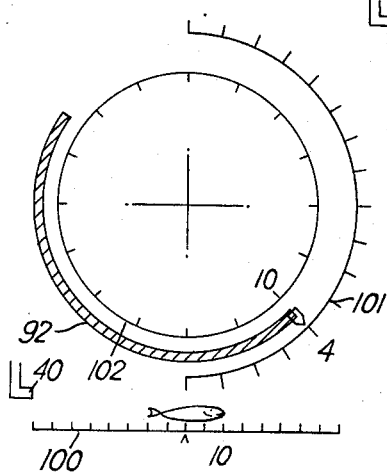
Inventors
CHARLES HENRY WILLIAMSON
LORENTZ SAVILLE
By
Bailey, Stephens & Huettig
Attorneys

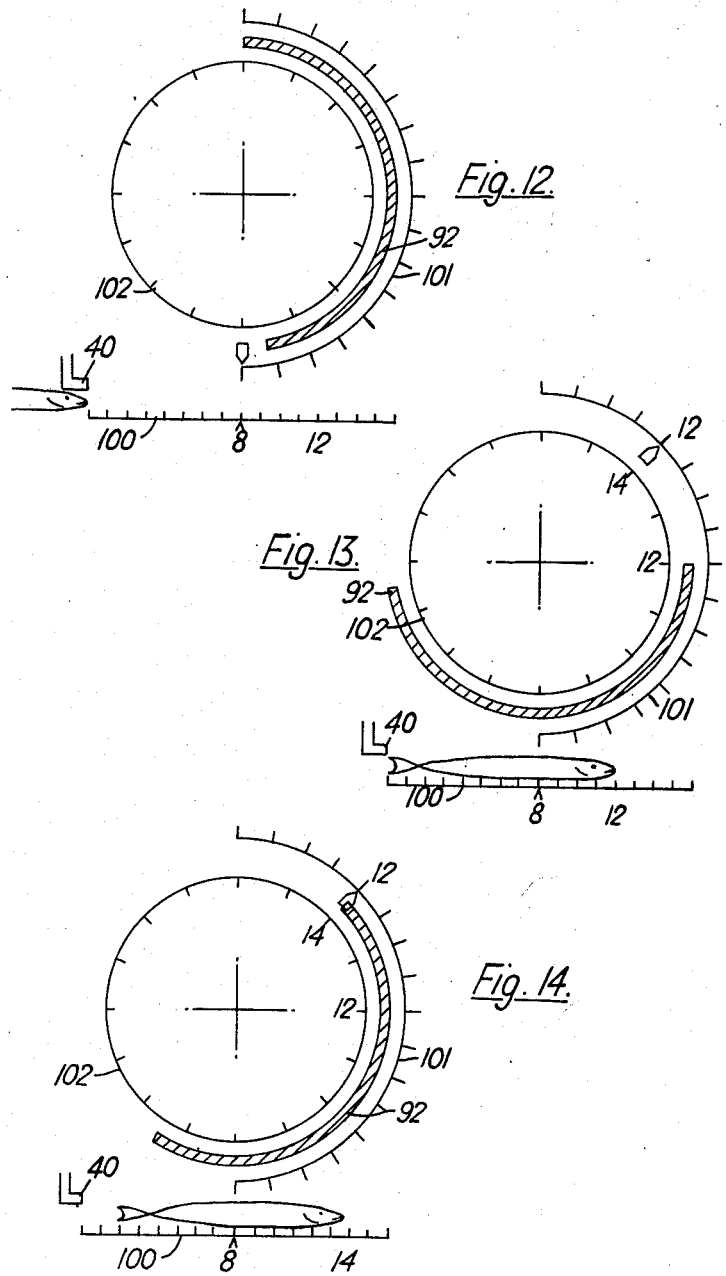

_United States Patent Office_

3,187,375
Patented June 8, 1965

3,187,375
FISH-DRESSING MACHINES
Charles H. Williamson and Lorentz Saville, Hull, England, assignors to Fisadco Limited, London, England, a British company
Filed Jan. 15, 1963, Ser. No. 251,624
11 Claims. (Cl. 17—3)

In the mechanical dressing of fish it is well known to measure the fish by a feeling device, commonly in the form of two pivoted feelers spread apart by each fish in turn as it travels through the machine, and to employ the movements of the feeling device to control the operation of one or more dressing tools so that account is taken of the size of the fish. The machine may be so constructed that the tool is not allowed to move until the feeling device disengages from the fish. For instance a gilling tool may be moved into contact with the gills under such control. Now the moment when such a movement must be made often varies not with the total length of the fish but with a fraction of that length, and this introduces complications. In gilling, for instance, the movement of the tool must take place after a time (measured from zero for each fish) that depends not on the measured total length of the fish, but rather on the length of the fish from the tail to the gills.

In order to take account of these requirements it is known to make the feeling device itself move at a rate such that the ratio of the differential speed of movement between the device and the fish to the speed of the fish corresponds to the fraction of the fish length that is the determining factor. A travelling feeling device may, however, be damaged by a crooked rigid fish, and in any case does not measure such a fish reliably. It is necessary, therefore, to make the feeling device stationary in the relation to the movement of the fish, though laterally displaceable by the fish.

In one prior proposal for solving the problem thus presented, a gilling tool has been continuously moved towards the fish from a zero position during the engagement of the fish by the feeling device, so that on being subsequently positively moved as a result of the disengagement of the fish from the feeling device it has had to travel through a shorter distance from its adjusted starting position in order to strike a longer fish and vice versa. Machines working on this principle have not been satisfactory in practice. Moreover this principle cannot be employed when the tool is such that it must be moved from a definite position, and not from an adjusted starting position.

An example of a tool which must be moved from a definite position is a knife for slitting the belly of a round white fish in a gutting machine, as described in British Patent No. 880,176 (published October 18, 1961). This knife must cut through the underside of the belly of a fish travelling head-end first and for this purpose must be in a definite position in the machine until the vent is reached, and then must be moved into another position out of contact with the fish.

We aim at providing a timing mechanism by which a dressing tool is moved from a definite position when a part of a fish travelling at constant speed is at a given point with the use of a feeling device stationary in relation to the movement of the fish but laterally displaced by it.

According to the invention the tool is moved by a mechanism brought into action by the engagement of a part of it with an element that is moved into a position that depends on the length of the fish. This element is connected to and moved into the required position by a normally stationary part of a clutch and the feeling device is operatively connected to the clutch to cause it to engage so long but only so long as the feeling device is displaced by the fish.

The preferred construction according to the invention will now be described in detail with reference to the accompanying drawings, in which:

FIGURE 2 is a plan of this part of the machine;

FIGURES 3 and 4 show two positions of the knife which makes the gutting cuts;

FIGURES 3a and 3b are plan views of the latching mechanism;

FIGURES 9, 10 and 11 are diagrams showing three positions of part of the timing mechanism when a short fish is in the machine; and FIGURES 12, 13 and 14 are diagrams similar to FIGURES 8 to 10 when a longer fish is in the machine.

Figure 1:
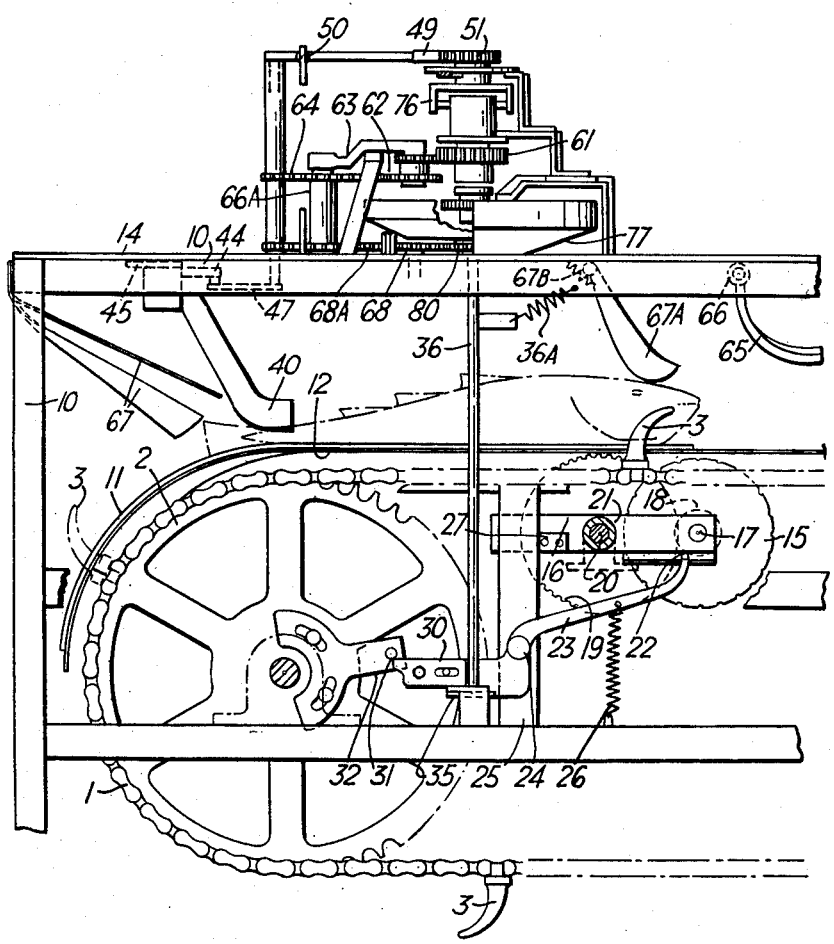
FIGURE 1 is a side elevation of part of a machine for gutting cod and similar fish.
Figure 5:
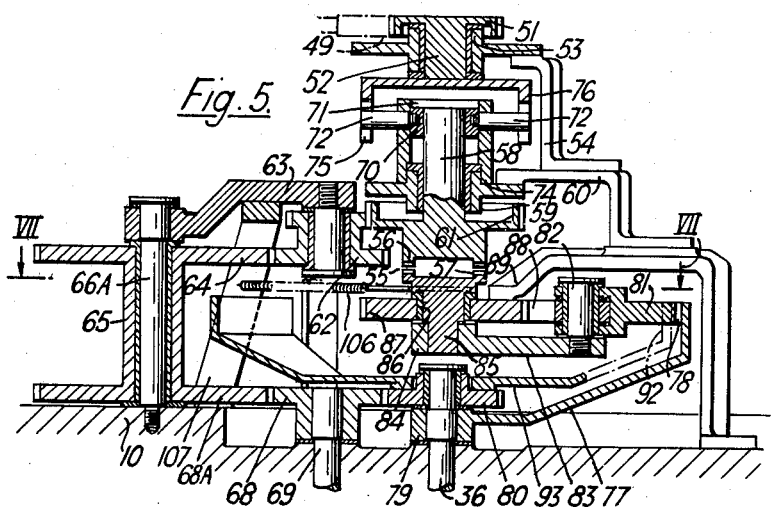
FIGURE 5 is a central vertical section on a larger scale through the timing mechanism on the line V—V of FIGURE 2.
Figure 6:
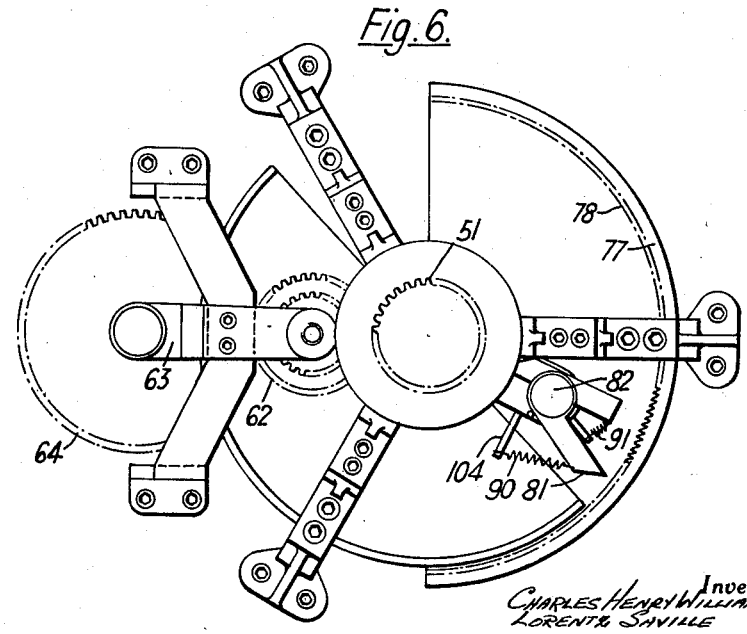
FIGURE 6 is a plan of the parts shown in FIGURE 5.

The machine shown is essentially the same as that shown in British Patent No. 880,176, except that it incorporates the timing mechanism of the present invention. The machine comprises a main frame 10 including two rods 11 mounted on the frame in a manner not shown on which the fish is pulled by pairs of hooks 3 (only one of each pair being shown) carried by two endless conveyor chains 1 which pass round wheels 2. Each fish is engaged by a pair of hooks 3 as the conveyor moves upwards into its upward run and travels belly downwards over the rods 11. The rods lie above a supporting plate 12 (fixed on frame 10) in which, over the length of the frame in which the gut removal takes place, there is a central longitudinally extending slot between the rods 11, as shown at 13.

Above the rods and supporting plate there is a fixed horizontal frame member 14 carrying two sheet metal guides 67 and a lever 67A arranged to bear on the back of the fish and urged downwardly by a spring 67B so as to force the fish downwardly, and a similar but smaller lever 65, urged downwardly by a torsion spring 66, all of which centralise the fish as it travels.

The fish must be cut by a belly-slitting knife 15 turning below the ends of the rods 11 in a carrier 16. The carrier can rock around a shaft 20, and the knife, which is continuously driven, is moved up and down as the carrier rocks. The carrier 16 is pivotally connected at 22 to one end of a bell-crank lever 23, the pivot 24 of which is fixed in a vertical member 25 of the main frame.

The lever 23 is urged to rock clockwise about the pivot 24, as seen in the drawings, by a spring 26. This rocking movement causes the carrier 16 to rock about the shaft 20. The movements of the carrier 16 are constrained, since the sleeve 21 is fixed. The carrier has a lateral stop 27 which engages the side of the member 25 to limit the clockwise movement of the lever 23. The stop 27 is in engagement with the member 25, and the knife 15 lies wholly below the support, unless the lever 23 is positively rocked or held out of the position shown in FIGURE 1.

The lower end of the lever 23 has two arms, one arm 30 lying in the path of a pin 31 on a plate 32 which is bolted to one of the conveyor wheels 2. When this pin 31 engages the arm 30, the lever 23 is rapidly rocked to raise the carrier 16 and knife 15 into the position shown in FIGURE 3, and immediately the pin disengages itself from the arm 30 the knife carrier rapidly rocks downwards into the position shown in FIG. 4. The arm 30 of the lever 23 projects laterally at 35 to be engaged by a rotary eccentric abutment 34 carried by a vertical shaft 36 and arranged so that on rotation of the shaft it is carried into and out of vertical registration with the protection 35. In the normal position the abutment 34 rests against the side of the lateral projection 35 of the arm (see FIGURE 3a) and does not interfere with the upward movement of the carrier 16. As the carrier 16 is rocked to carry the knife 15 upwards to the maximum extent, as shown in FIGURE 3, the shaft 36 turns under the action of spring 36A, which tends to turn the shaft clockwise, in FIGURE 2, to bring the abutment 34 above the projection 35 (see FIG. 3b). In consequence, another pin 31 clears the arm 30 and the carrier moves backwards from the position shown in FIGURE 3, the arm 30 is unable to return to its initial position, but is held in the operative position shown in FIGURE 4 by the abutment 34. In this position the abutment holds the knife 15 with its edge just above the surface of the supporting plate 12. This is the definite position referred to above, and when the vent of the fish arrives at the knife 15, the knife must be rapidly moved downwards out of this position and out of contact with the fish into the position shown in FIGURE 1.

The rotary movements of the shaft 36 are controlled by the fish itself through the timing mechanism according to the invention. Each fish engages a feeling device which is fixed as a whole in the machine and which comprises two feelers 40 spread apart laterally by the fish. The feelers 40 are mounted to rock about vertical pivots 41 and extend downwards so as to bear one on each side of the fish and to be spread apart against a spring 42 that interconnects them. The feelers carry toothed segmental arms 45 which intermesh to cause the feelers to move together to equal extents. One feeler 40 is also rigid with a cam disc 44, the edge of which is engaged by a roller 44a which enters a notch 46 when the feelers are not spread apart by a fish. The roller 44A is carried on one end of a bell-crank lever 47 pivoted at 48, the other end of which carries a toothed sector 49. The lever 47 is engaged by a spring 50, and when a fish passes between the feelers the cam disc 44 is turned so that the roller 44A is forced out of the notch 46 and the lever 47 is rocked against the spring 50.

The sector 49 engages a toothed wheel 51 that is integral with a short shaft 52 which can turn freely within a fixed sleeve 53 carried by a bracket 54. When the sector 49 turns, the wheel 51 turns also and when the fish leaves the feelers 40, they close and so allow the spring 50 to restore the sector 49 to its initial position.

The rocking movements of the sector 49 bring about engagement and disengagement of a clutch 55, which includes two dogs 56 and 57, the dog 56 rotating continuously and the dog 57 being normally stationary. The dog 56 is on the lower end of a shaft 58 which is mounted in a bearing 59 carried by a bracket 60. The shaft 58 is integral with a toothed wheel 61 engaged by a gear wheel 62, which is carried by a bracket 63 and which also engages a gear wheel 64 on a sleeve 65. This sleeve, which surrounds a fixed shaft 66a mounted in the bracket 63 and in a part of the main frame 10, carries a second gear wheel 68A which meshes with a wheel 68 fixed to the upper end of a continuously driven shaft 69. The gearing is such that the shaft 58 is driven at a lower speed than shaft 69, in the form shown at half the speed of the shaft 69.

Figure 8:
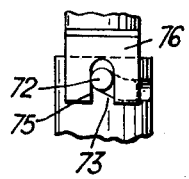
FIGURE 8 is an elevation of a part of the clutch engaging mechanism.

The shaft 58 is surrounded by a collar 70, which does not turn with the shaft and which engages the underside of a flange 71 on the shaft. This collar 70 carries two radial pins 72 which pass through slots 73 in a bush 74 that surrounds the collar 70. The pins enter vertical slots 75 in a yoke 76 which is rigid with the shaft 52 of the toothed wheel 51. Each slot 73 has an inclined part merging into a horizontal part, as shown in FIGURE 8. When the feelers 40 are closed, each pin 72 lies at the upper end of the corresponding slot 73. As the feelers are spread apart and the yoke 76 is turned, each pin is forced to move downwards so that the dog 56 engages the dog 57 after a spreading movement equivalent to that produced by the smallest fish for which the machine is designed. Further spreading is accommodated by movement of the pins through the horizontal parts of the slots. The reverse action occurs when the fish leaves the feelers.

Figure 7:
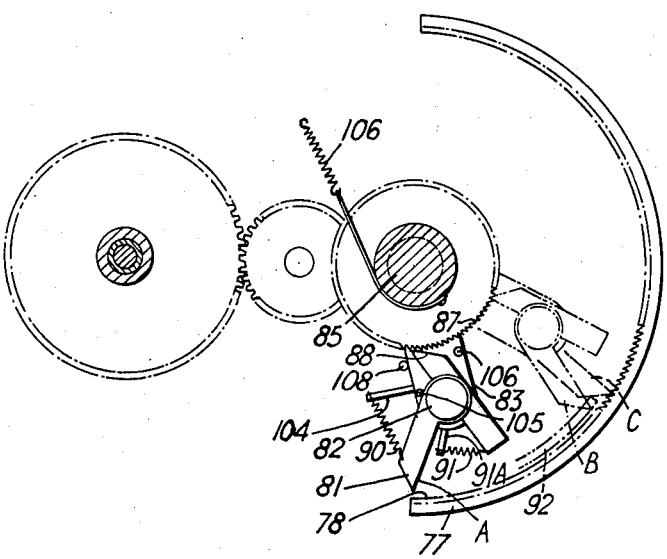
FIGURE 7 is a section on the line VII—VII in FIGURE 5.

The dog 57 is fixed to the upper end of a shaft 85, which is surrounded by a bush 86, around which a circular ratchet 87 is mounted, this ratchet being fixed to a stationary bracket 89. An arm 83 extends from a boss fixed to the shaft 85 and carries a pin 82. A pawl 81 is mounted to rock round this pin into and out of engagement with ratchet teeth 78 on a sector 77. The sector 77 is secured on the spindle 36 and rocks it to bring about movement of the knife 15 from the position shown in FIGURE 4 to that shown in FIGURE 1 when the vent of the fish reaches the knife. In fact the sector 77 extends from a boss 79 that is splined to the upper end of the spindle 36 below a gear wheel 80 that can turn freely round the spindle and that meshes with the continuously driven wheel 68. The pawl 81 is urged to rock clockwise as seen in FIGURE 7 by a spring 90 which is anchored to a pin 104 that extends from the arm 83, the pawl being limited in its clockwise movement by a stop 105 on the arm 83. The pawl is thus normally held clear of the ratchet teeth 78, but when it engages them the sector 77 is moved and the mechanism for lowering the knife 15 is thus operated. The pawl 81, moving as a whole with the arm 83 and dog 57, is the element which is moved into the position that depends on the length of the fish. It arrives in this position ready to be engaged with the ratchet teeth 78, and is held in it until so engaged by a second pawl 88 which is also mounted on the pin 82 and which cooperates with the fixed ratchet 87. The pawl 88 is urged to rock clockwise by a spring 91 which is anchored to a pin 91A that also extends from the arm 83, the pawl normally riding on the teeth of the ratchet 87.

The shaft 85 is urged to turn clockwise by a spring 106 anchored to a support 107 for the bracket 63, and in consequence the arm 83 is also urged to turn clockwise, its movement in this direction being limited by a stop 108.

The pawl 81 is caused to engage the teeth 78 by a cam 92, which is a semi-circular bar on the outer end of a sector 93. The sector 93 is fixed to the wheel 80 and thus continuously rotates at the same speed as the shaft 69, i.e., at twice the speed of the arm 83 when it is turning.

Pawls 81 and 88 are carried by the arm 83 and move together round the shaft 85. This arm is normally stationary, but it can be clutched into the slow-moving shaft 58. The arm 83 will then begin to turn with the shaft 85, and the pawl 88 will ride over the teeth 87 while the pawl 81 is held clear of the ratchet 78. The turning will continue until the clutch 55 is disengaged. Thereupon the spring 106, which has been resisting the turning movement of the arm 83, will cause that arm to begin to rock back again. This will at once cause the pawl 88 to engage the teeth of the fixed ratchet 87, with the result that immediately the shaft 85 and arm 83 become locked in position by this engagement of 88 with 87. 81 is still held out of engagement with anything. This is the position shown at B in FIGURE 7.

All the parts referred to now remain stationary until the cam 92 comes along. Its front edge hits the pawl 81 and moves it from B to C. When the pawl 81 is in the position C, the front edge of the cam 92 in its continued movement, by engagement of pawl 81 with the teeth of sector 77, carries the rack along with it so as to turn shaft 36 counterclockwise and move stop 34 out of the path of projection 35 to the position shown in FIGURE 3a. This releases arm 23, and the slitter moves downward to the inoperative position of FIGURE 1.

Figure 7A:
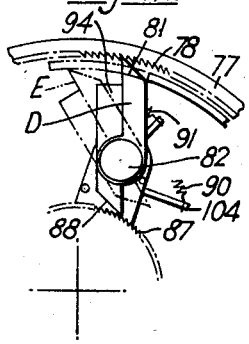
FIGURE 7A shows part of the mechanism of FIGURE 7 at different stages in the action.

This movement of the parts lasts only through the angular distance necessary for the pawl 81 to strike the heel 94 of the pawl 88, thus reaching to the position shown at D. Thus the timing device has done its work when we have got to the position D (FIGURE 7A), and all that is necessary is to release the pawl 81 from the teeth 78. 81 is still pushed by the nose of the cam 92, but is in engagement with the heel 94. Something must give, and 88 yields against the spring 91 into the position E, in which 81 rides on the inner face of 92. There is now nothing to prevent the arm 83 being returned to initial position by the spring 106. The pawl 81 is in engagement with the inner face of 92, and not the nose, and so long as this is the case the pawl 88 is kept out of the teeth 87. When the tail of the cam 92 passes the pawl 81, the spring 90 rocks 81 back and the spring 91 rocks 88 back.

Once the pawl 81 has been taken out of engagement with the teeth 78, there is nothing to prevent 78 moving backwards with the shaft 36 under the action of the springs 36A.

These movements are diagrammatically shown for a fish of minimum size in FIGURES 9 to 11, which include three scales, namely a scale 100 for the fish, a scale 101 for the pawl 88 and a scale 102 for the leading end of the cam 92. The knife 15 moves up when the front end of the fish reaches position 8 (this being the position shown in FIGURE 1), and must always move down when the vent of the fish is at the point 8 on the fish scale. FIGURE 9 shows the position as the fish arrives at the jaws. At this point, cam 92 is in the position shown in FIG. 9. The clutch 55 is then engaged, and arm 83 begins to move. FIGURE 10 shows the position when the fish is just leaving the feelers, which therefore close and bring about disengagement of the clutch. Arm 83 then remains stationary, the amount of movement of the arm depending then on the length of the fish. The minimum fish is four scale units long, and so must travel through a further six scale units before its vent is at the point 8. This position, in which the cam 92 engages the pawl 88, thus first engaging pawl 81 with segment 77 and then releasing pawl 88 from rack 87, so that the knife 15 moves down, is shown in FIGURE 11.

FIGURES 12 to 14 are similar diagrams for a fish 12 scale units long. In the position shown in FIGURE 13 the fish, having just left the feelers 40, must still move through two scale units to bring the vent over the knife and the cam must likewise move through two units to reach the pawl 88.

Initial adjustment to ensure that the knife moves exactly at the right moment despite any delay while the timing mechanism and the operating mechanism for moving the knife 15 are performing their functions is easily effected by angular setting of the cam 92.

If a fish of different proportions is being gutted, the necessary adjustment is easily effected by changing the speed ratio of the driving shaft to the shaft 56. This ratio as explained above is 2:1 for a cod that has not been headed.

The timing mechanism described may be used in other fish-dressing machines, e.g. those for removing the gills from herrings, machines for making cuts round the backbones of haddocks, and machines for removing part only of the backbones of round fish before these fish are salted.

We claim:

1. A fish-dressing machine comprising means to transport a fish head forwards along a path, means mounting a cutting member adjacent the path for movement between an operative position engaging a fish carried by said transporting means and an inoperative position out of engagement with such fish, means operatively connected to the transporting and mounting means to move the cutting member into operative position at a time not later than the time when the head of the fish comes opposite the cutting member, a feeler element engageable with a fish carried by said transporting means and relatively fixed with relation to the direction of movement of the transporting means but movable laterally with respect to such direction, and control mechanism operatively connected with said feeler element and said mounting means and responsive to both outward and inward movement of said mounting means, as the fish first displaces the feeler member and then permits its return, to produce movement of said cutting member to inoperative position when the fish has reached a point at which a predetermined fraction of its length has passed the position of the cutting member.

2. In a device as claimed in claim 1, said control mechanism comprising a clutch which is engaged and then disengaged by the displacement and return of the feeler member, respectively.

3. A fish-dressing machine comprising means to transport a fish head forwards along a path, means mounting a cutting member adjacent the path for movement between an operative position engaging a fish carried by said transporting means and an inoperative position out of engagement with such fish, means operatively connected to the transporting and mounting means to move the cutting member into operative position at a time not later than the time when the head of the fish comes opposite the cutting member, releasable means operatively engageable with the mounting means to hold the cutting member in such operative position, a feeler element engageable with a fish carried by said transporting means and relatively fixed with relation to the direction of movement of the transporting means but movable laterally with respect to such direction, and control mechanism operatively connected with said feeler element and said mounting means and responsive to both outward and inward movement of said mounting means, as the fish first displaces the feeler member and then permits its return, to produce movement of said cutting member to inoperative position when the fish has reached a point at which a predetermined fraction of its length has passed the position of the cutting member, a first normally stationary control part movable in a path, means normally urging said first control part for movement in said path in one direction, a second control part constantly driven in synchronism with said transporting means to move in said path in a direction counter to such direction of movement of said first control part, stop means for holding said first control part, when the fish reaches a position opposite the cutting member, in a normal position in said path substantially in advance of said second control part, means responsive to displacement of said feeler element to move said first control part along said path from such normal position along said path in the same direction as the second control part but at a lower speed, means responsive to the return of the feeler element to stop the movement of the first control part in an advanced position dependent on the length of the fish, means to hold the first control part in such advanced position, said second control part in its movement engaging the first control part, and means responsive to such engagement to release the cutting member holding means to allow the return of the cutting member to inoperative position.

4. In a device as claimed in claim 3, said last means further including means for releasing the means holding the first control part in advanced position, thereby allowing said first control part to return to its normal position.

5. In a device as claimed in claim 4, said means for moving and stopping the movement of the first control part comprising a clutch which is engaged and then disengaged by the displacement and return of the feeler member, respectively, said clutch being connected to the driving means for the second control part.

6. In a fish dressing machine including means for conveying a fish at constant speed, a dressing tool for performing a dressing operation on said fish during its conveyance, and control means for controlling the operation of said dressing tool, said control means comprising a feeler which is adapted to be deflected laterally by contact with said fish as said fish moves thereby, a first control part, means actuated by said feeler to move said first control part along a path while said feeler is deflected, a second control part spaced apart a predetermined distance behind said first control part along said path, means for moving said second control part along said path at a speed which is a predetermined proportion greater than that of said first control part, and means for controlling said dressing tool, said controlling means being actuated by engagement of said second control part with said first control part when said second control part catches up with said first control part during the movement of both said parts along said path, said first control part being set in motion from a zero position when the leading end of said fish reaches a zero position in which it engages and deflects said feeler and remaining in motion until the trailing end of said fish reaches the zero position of said fish and disengages said feeler, and said second control part moving from a zero position the predetermined distance behind the zero position of said first control part as the leading end of said fish reaches its zero position, whereby said second control part passes the zero position of said first control part as the leading end of said fish reaches a datum position and said second control part thereafter catches up with and engages said first control part and said tool is actuated as a part of said fish said predetermined proportion of its length from its leading end reaches said datum position.

7. A machine as claimed in claim 6, wherein said means actuated by said feelers to move said first element comprises a driven part of a clutch, said clutch being engaged by deflection of said feeler.

8. A machine according to claim 6 in which the first control part includes a pawl cooperating with a rack that forms part of the means for controlling the operation of the dressing tool.

9. In a machine according to claim 8, a continuously moving cam constituting the second control part, said pawl lying in the path of such cam whereby the cam engages the pawl to displace it and the rack in order to bring about the control of the dressing tool and thereafter moves past the pawl.

10. In a machine according to claim 6, a clutch means having a normally stationary part for actuating said first control part, the normally stationary part of the clutch carrying a pawl, a circular ratchet, said pawl on the disengagement of the clutch engaging said circular ratchet to hold the first control part in the position into which it has been moved.

11. In a machine according to claim 10, a spring operatively connected to said pawl, said normally stationary part being turned against said spring and returned by it on disengagement of the pawl from the ratchet.

References Cited by the Examiner
UNITED STATES PATENTS

| 2,180,303 | 11/39 | Baader | 17—3 |
| 2,381,560 | 8/45 | Savrda | 17—3 |
| 2,893,052 | 7/59 | Schlichting | 17—3 |
| 2,930,076 | 3/60 | Rowton et al. | 17—3 |

SAMUEL KOREN, *Primary Examiner.*
LUCIE H. LAUDENSLAGER, *Examiner.*